March 5, 1946.   J. M. WALTER   2,396,139
MACHINE TOOL TABLE DRIVE
Filed March 14, 1945   2 Sheets-Sheet 1

INVENTOR.
JOHN M. WALTER
BY Allen & Allen
Attorneys

INVENTOR.
JOHN. M. WALTER
BY Allen & Allen
Attorneys

Patented Mar. 5, 1946

2,396,139

UNITED STATES PATENT OFFICE 2,396,139

MACHINE TOOL TABLE DRIVE

John M. Walter, Cincinnati, Ohio, assignor to The G. A. Gray Company, Cincinnati, Ohio, a corporation of Ohio Application March 14, 1945, Serial No. 582,632

6 Claims. (Cl. 74—440)

My invention relates to drives for tables of machine tools in which provision is made to avoid backlash such as is encountered when practicing "climb milling." When a rotating cutter is applied to a piece of work which moves past the cutter and the cutter is rotated so as to oppose the movement of the work, the cutting pressure is counter to the drive at all times, but when the cutter is rotated so as to rotate in the direction that the work is moving, it tends to act intermittently. That is to say, in a cutter in which only one tooth at a time engages the work, the cutting force is maximum when the tooth engages the work and is zero as the tooth leaves the work. Where the cutter has a number of cutting teeth in engagement at one time with the work, there is no such variation in cutting force but the variation of magnitude of the force still exists. Since the cutter tends to advance the work on its own account, the result is a jerky action which takes up intermittently the backlash of the drive. Frequently cutter teeth are broken or the drive gearing is injured due to the jumping ahead of the table which causes the approaching cutter tooth to suddenly start to remove a thicker chip than the mechanism was designed to permit.

There are decided advantages in climb milling, however. Principally they are increased feed rate, longer cutter life and better finish. For reasonable cutter life, using carbide tipped cutters in the milling of steel, climb milling is required.

Even in very large planer type milling machines, with a table weighing 16,000 pounds, climb milling has proven unsatisfactory because the vibration of the table due to the intermittent cutting action cuts down the friction of the ways, and in the absence of backlash prevention, results in a jerky action even with a light finishing cut.

It is to the end of providing for backlash prevention in rack and worm drives suitable for very large as well as small machine tables, that my present invention is directed.

In the drawings, which illustrate the application of my drive to a helical screw and rack—

The housing or bed of a machine tool is indicated at 1, and the feed table portion which slides thereon is indicated at 2. A rack 19 is secured fast to the table at a slight angle to the axis of the drive pinion, and is engaged by the helical drive gear member 5. As indicated, there is a small play between the helix and the rack teeth. The member 5, is keyed fast to the shaft 6, which is driven to the right and to the left to cause the rack to move to and fro and with it the table moves to and fro. Bearings 7 and 8 are provided for the shaft 6 in the bed or housing 1.

Figure 4:
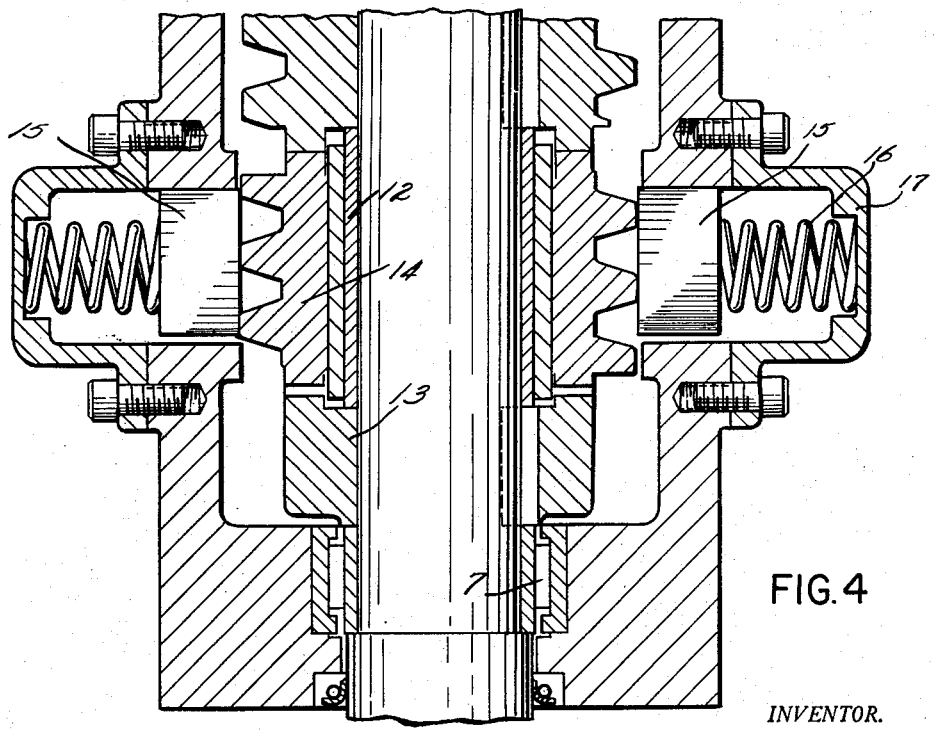
Figure 4 is a section on line 4—4 of Figure 3.

Thrust bearings 9 and 10 are provided, the bearing 9 acting on the end of the helical gear member, and bearing 10 on a nut 11 on the shaft which is adjusted to take up end play. A sleeve 12 (Figure 4), takes the thrust of the helical member on its other end, said sleeve abutting a collar 13, keyed to the shaft. The collar 13 is shouldered against the bearing race of the bearing 7.

A smaller helical gear member 14 is held on the shaft 6 so as to both slide and rotate, there being a bushing shown as mounted on the sleeve 12, which bushing is shorter than the sleeve 12, with the helically threaded member on this bushing. Cams 5a are formed on the helical drive member and cams 14a formed on the portion 14 of the member 5. Likewise cams 14b are formed on the other end of the portion 14 and cams 13a on the thrust collar 13.

Non-metallic brake blocks 15, are mounted in slots in the frame work or the bed, and bracket members 17 held over these slots contain springs 16 which press the blocks into contact with the helical thread on the portion 14.

Figure 1:
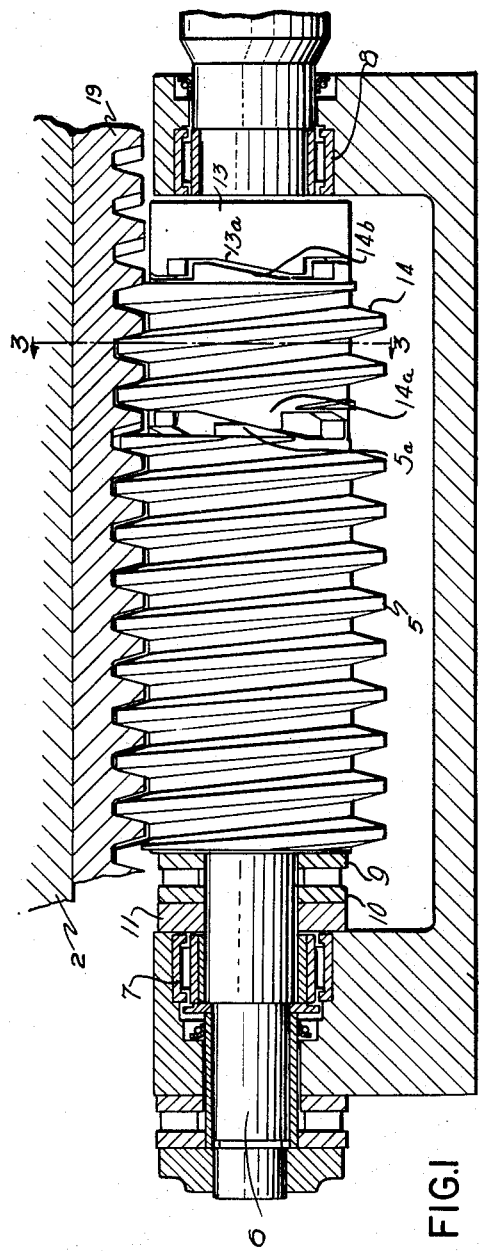
Figure 1 is a longitudinal vertical section taken through the drive showing the position of the parts when the screw is rotating clockwise.
Figure 2:
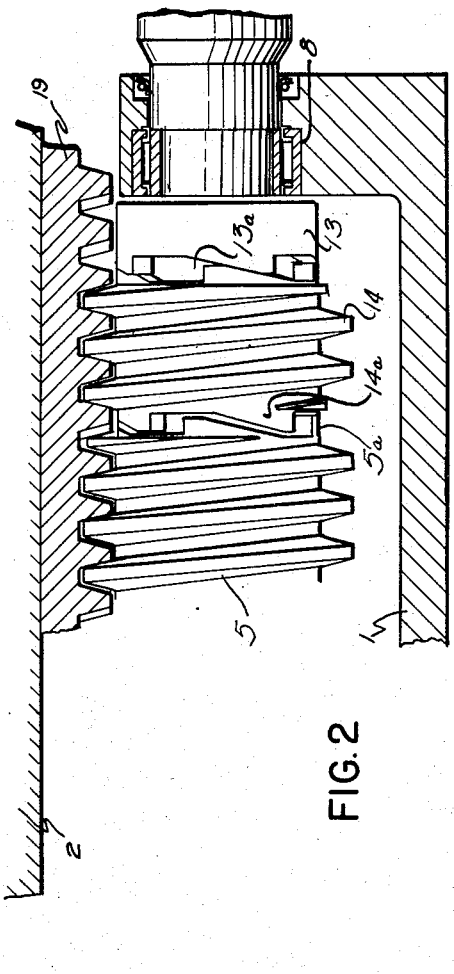
Figure 2 is a fragment of the same view of Figure 1, showing the relation of parts when the screw is turning counterclockwise.

In the position shown in Fig. 1, the drive member 5 bears against the right hand side of the teeth on the rack 19 in the act of feeding the rack to the left (in that figure). The hold back member 14 is caused to rotate by the frictional effect between the cam faces 5a and 14a, i. e. counterclockwise, but it is held by the brake shoes from turning freely and as a result the camming effect thrusts the helical thread on the part 14 against the left hand walls of the rack teeth. When the shaft 6 is turned in the other direction, viz., clockwise, as shown in Fig. 2, the helix engages the left hand wall of the rack teeth. In this instance the drag on the gear member 14 results in the cam faces 13a and 14a coming into operation to push the said member 14 to the left and brings its helix into firm contact with the right hand wall of the rack teeth.

Thus the play in the structure, necessary for proper engagement of the helical drive portion with the rack teeth does not result in such play as will result in backlash, and climb milling will be possible in either direction of motion.

Figure 3:
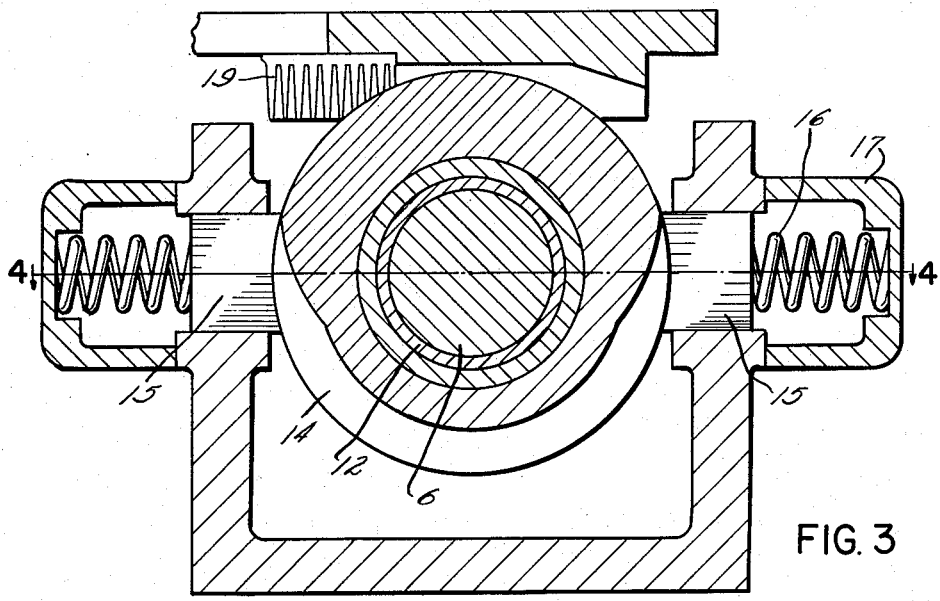
Figure 3 is a cross section on the line 3—3 of Figure 1.

The extent of engagement of what we have termed the rack need not be a line contact. Thus the rack may be curved to present a half nut effect if desired, by a suitable modification of the rack and alignment of the rack with reference to the worm, and modification of the housing 1 (e. g. in Figure 3 lowering the position of the blocks 15 and the brackets for the springs 16).

In the claims that follow I refer to a rack element fixed to the table, by which is intended to be included modifications such as are suitable for use with a helical threaded driver engaging teeth fast on the table, with the thread on the driver engaging the teeth and causing the table to move while the driver remains in a fixed position.

Having thus described my invention, what I claim as new and desire to secure by Letters Patent is:

1. A machine tool table feed comprising a fixed rack element on the table, and a rotary helically threaded drive member engaging the rack, said drive member including a portion also helically threaded to engage said rack element and coaxially slidable as well as rotatable with reference to the drive member, said portion having one face thereof equipped with cam faces, cam faces on the drive member and frictional means opposing rotation of said portion, said cam faces arranged to thrust the portion away from the drive member due to the action of the frictional means.

2. A machine tool table feed comprising a fixed rack element on the table, and a rotary helically threaded drive member engaging the rack, said drive member including a portion also helically threaded to engage said rack element and coaxially slidable as well as rotatable with reference to the drive member, said portion having one face thereof equipped with cam faces, cam faces on the drive member and frictional means opposing rotation of said portion, said cam faces arranged to thrust the portion away from the drive member due to the action of the frictional means, said portion also having cam faces on its other end of opposite face to the cam faces above noted, and a thrust member rotating with the drive member, and having cam faces, said latter faces arranged to thrust the portion away from the thrust member and toward the drive member, due to the action of the frictional means.

3. A non-back lash driver for engaging a toothed element to be driven comprising a rotatable shaft, a threaded gear member mounted fast on said shaft, an additional threaded gear member rotatable and slidable on said shaft, a thrust collar rotating with the shaft, cam faces on the gear member and thrust collar and on the additional gear member, and frictional means opposing rotation of the additional gear member, said cam faces being of opposite cam angle, at the two ends of the additional gear member.

4. The combination of claim 3 in which the toothed element is a rack and the gear members have helical ribs thereon.

5. A non-back lash driver for engaging a toothed element to be driven comprising a rotatable shaft, a threaded gear member mounted fast on said shaft, an additional threaded gear member rotatable and slidable on said shaft, a thrust collar rotating with the shaft, cam faces on the gear member and thrust collar and on the additional gear member, and frictional means opposing rotation of the additional gear member, said cam faces being of opposite cam angle, at the two ends of the additional gear member, said frictional means comprising spring pressed brake shoes engaging the periphery of the additional gear member.

6. A non-back lash driver for engaging a toothed element to be driven comprising a rotatable shaft, a threaded gear member fast on the shaft, a sleeve on the shaft acting as a thrust member for the gear member, a collar fast on the shaft acting as a thrust member for the sleeve, an additional threaded gear member mounted rotatably and slidably on the sleeve, opposed cam faces of opposite angle of thrust at the two ends of the additional gear member, and cam faces of opposite angle of thrust on the end of the fast gear member and the collar in engagement with the cam faces on the additional gear member, as and for the purpose described.

JOHN M. WALTER.